US012784382B2

(12) United States Patent
Luo et al.

(10) Patent No.: US 12,784,382 B2
(45) Date of Patent: Nov. 3, 2026

(54) ENHANCED LATENCY-ADAPTIVE VIEWPORT PREDICTION FOR VIEWPORT-DEPENDENT CONTENT STREAMING

(71) Applicant: Intel Corporation, Santa Clara, CA (US)

(72) Inventors: Ying Luo, Shanghai (CN); Xiaomin Chen, Shanghai (CN); Hongbo Lv, Shanghai (CN); Yanying Sun, Shanghai (CN); Hua Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 18/850,453

(22) PCT Filed: Apr. 29, 2022

(86) PCT No.: PCT/CN2022/090181
§ 371 (c)(1),
(2) Date: Sep. 24, 2024

(87) PCT Pub. No.: WO2023/206332
PCT Pub. Date: Nov. 2, 2023

(65) Prior Publication Data
US 2025/0218133 A1 Jul. 3, 2025

(51) Int. Cl.
*G06T 19/00* (2011.01)
*H04N 21/218* (2011.01)

(52) U.S. Cl.
CPC ..... *G06T 19/006* (2013.01); *H04N 21/21805* (2013.01)

(58) Field of Classification Search
None
See application file for complete search history.

(56) References Cited

U.S. PATENT DOCUMENTS

2019/0230142 A1 7/2019 He et al.
2020/0374506 A1 11/2020 Petrangeli
(Continued)

FOREIGN PATENT DOCUMENTS

CN 1672325 A 9/2005
CN 112219406 A 1/2021
(Continued)

OTHER PUBLICATIONS

International Searching Authority, "International Search Report," issued in connection with International Application No. PCT/CN2022/090181, mailed on Jan. 4, 2023, 4 pages.
(Continued)

*Primary Examiner* — Yi Wang
(74) *Attorney, Agent, or Firm* — Hanley, Flight & Zimmerman, LLC

(57) ABSTRACT

This disclosure describes systems, methods, and devices related to latency-adaptive viewport prediction for use in viewport-dependent content streaming. A method may include identifying, by a virtual reality (VR) or augmented reality (AR) device, first viewport data used by and received from a display device; generating a first estimated compensation latency based on at least one of a first network latency and by the processing circuitry, from among multiple candidate viewport prediction models each using a different respective time interval, a first viewport prediction model based on a comparison of the first estimated compensation latency to a first time interval used by the first viewport prediction model; generating, using the first viewport prediction model and the first viewport data, a first viewport prediction; and selecting, based on the first viewport prediction, a first content tile for rendering by the display device.

20 Claims, 6 Drawing Sheets

(56) References Cited

U.S. PATENT DOCUMENTS

2022/0078396 A1* 3/2022 Gül ........................ H04L 65/403
2023/0388542 A1* 11/2023 Houdaille .............. H04N 19/70

FOREIGN PATENT DOCUMENTS

CN 113966600 A 1/2022
WO 2020069976 A1 4/2020

OTHER PUBLICATIONS

International Searching Authority, "Written Opinion," issued in connection with International Application No. PCT/CN2022/090181, mailed on Jan. 4, 2023, 3 pages.
Aykut et al., "Delay Compensation for a Telepresence System With 3D 360 Degree Vision Based on Deep Head Motion Prediction and Dynamic FoV Adaptation," IEEE Robotics and Automation Letters, vol. 3, No. 4, pp. 4343-4350, Oct. 2018, 8 pages.
Yang et al., "Single and Sequential Viewports Prediction for 360-Degree Video Streaming," 2019 IEEE International Symposium on Circuits and Systems (ISCAS), 2019, 5 pages.
Aykut et al., "Realtime 3D 360-Degree Telepresence With Deep-Learning-Based Head-Motion Prediction," IEEE Journal on Emerging and Selected Topics in Circuits and Systems, vol. 9, No. 1, pp. 231-244, Mar. 2019, 14 pages.

* cited by examiner

ENHANCED LATENCY-ADAPTIVE VIEWPORT PREDICTION FOR VIEWPORT-DEPENDENT CONTENT STREAMING

RELATED APPLICATION(S)

This application corresponds to the U.S. national phase of International Patent Application No. PCT/CN2022/090181, which was filed on Apr. 29, 2022. Priority to International Patent Application No. PCT/CN2022/090181 is claimed. International Patent Application No. PCT/CN2022/090181 is incorporated herein by reference in its entirety.

BACKGROUND

Virtual reality and augmented reality content streaming may be viewport-dependent. Latency and bandwidth are challenges to viewport-dependent content streaming.

DETAILED DESCRIPTION

Figure 1:
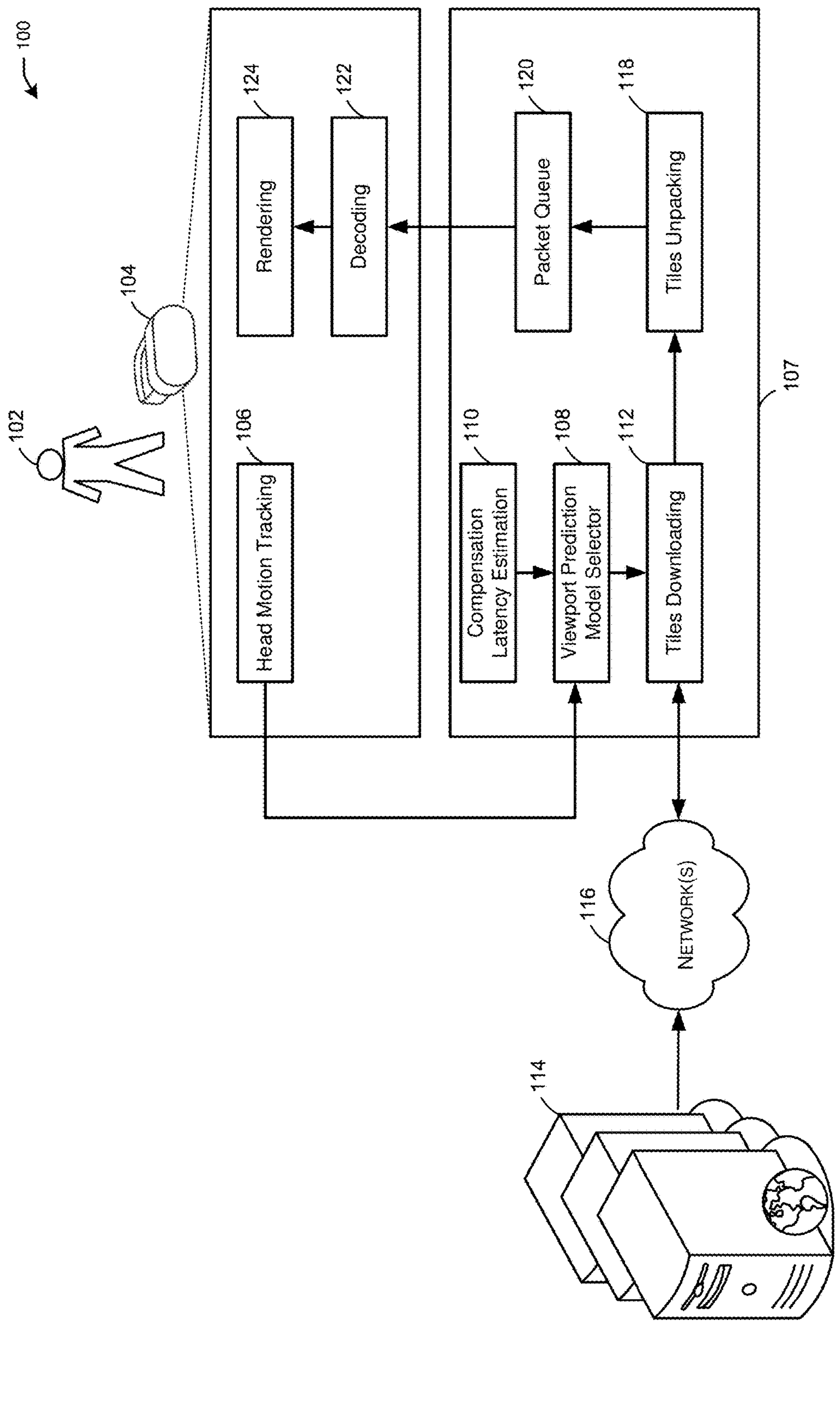
FIG. 1 is a network diagram illustrating an example system for latency-adaptive viewport prediction for viewport-dependent content streaming, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In recent years, enormous interest has triggered in the adoption of Virtual Reality (VR) and Augmented Reality (AR) in various fields to access the metaverse, such as entertainment, education, manufacturing, etc. Tiled video and 3D tiles are becoming the common formats of immersive content in viewport-dependent usages. To meet both bandwidth and latency challenges, some solutions adaptively send only the viewport of interest or perform pre-rendering at the edge in AR/VR applications. A challenging part of existing solutions is an ultra-low motion latency requirement. The time needed to completely reflect a user's motion and display the corresponding view on a screen is referred to as the motion-to-photon (M2P) latency. M2P latency may lead to motion sickness, and a user may experience visual discomfort.

However, there M2P latency often exists in viewport-dependent streaming systems. The general pipeline of the streaming is: (1) the client requires contents within a current FOV (Field of View); (2) processes the FOV streams; (3) renders to screen. Due to the latency of network and content processing, the user's perspective position may change while the available content belongs to previous FOV, so it is difficult to guarantee the quality of the content in the viewing area. This is the reason for M2P latency in a viewport-dependent streaming system.

Some existing viewport prediction techniques avoid or reduce the M2P latency, which predict the future viewport $V'_{t+t_p}$ according to the past trajectory viewport $[V_{t-t_s}, \ldots, V_t]$ to compensate for the latency of the whole pipeline from pose response to content rendering. In this manner, the pipeline latency may be considered in the present disclosure as compensation latency.

Some viewport prediction algorithms are used in AR/VR usages to reduce the M2P latency. Currently, there are some effective prediction algorithms based on viewing trajectory, such as a single viewport prediction model based on trajectory-based using convolutional neural network (CNN), and a recurrent neural network (RNN) in sequential viewports using both trajectory and content characteristics. Another existing technique includes a head-motion prediction model using deep neural network which is fed with a sequence of pan, tilt, and roll orientation values.

However, while the existing viewport prediction methods effectively reduce the M2P latency, the prediction interval is fixed in the prediction module, which is a core parameter before the model training. When adopting the prediction module in a real-time streaming system, the compensation latency is a dynamic value, which will be influenced by the network status, streaming contents complexity, and capability of devices in system. The fixed prediction interval of the existing techniques will lead to some accuracy loss in prediction and thus increase the M2P latency.

In one or more embodiments, when the enhanced viewport prediction described herein is adopted, the general steps are: (1) the client requires contents within predicted FOV, (2) processes the FOV streams (3) renders to screen. If the prediction interval is equal to compensation latency and the prediction is accurate, the M2P latency will be avoided.

In one or more embodiments, instead of the prediction interval being fixed as in some existing viewport prediction solutions, the enhanced solution herein uses the interval as a core parameter of the enhanced prediction models' training. When the system is running, the compensation latency changes dynamically according to the network status, streaming contents complexity, and capability of devices in the system. Therefore, a fixed prediction interval will lead to some accuracy loss in prediction and thus increase the M2P latency. The enhanced solution herein allows for a dynamic compensation latency while remaining accurate in viewpoint prediction.

In one or more embodiments, the present disclosure provides a method to select a viewport prediction model with an appropriate interval in a trained model pool. A viewport prediction model selector is designed to make the selection based on real-time feedback of compensation latency (e.g., dynamic compensation latency and selection of viewport prediction models).

In one or more embodiments, to reduce M2P latency, the enhanced techniques of the present disclosure utilize the real-time feedback of compensation latency and implement a viewport prediction model selector to choose the prediction model with the most appropriate interval in the model pool, which will effectively improve the accuracy of viewport prediction in the real-time system. The enhanced techniques of the present disclosure may improve the user experience.

In one or more embodiments, media content is stored in a content provider. On a head-mounted display (HMD) device, a user's head movement is traced, and the current viewport positions are sent to a VR/AR agent at intervals. The agent may timely select tiles within the user's FOV and download the corresponding content from the content provider, unpack the content, and then the HMD client would receive packets and complete decoding and rendering operations for the packets. To reduce the motion-to-high-quality (M2HQ) latency, the viewport prediction module may select tiles within predicted FOV in the future to avoid or reduce M2P latency.

In one or more embodiments, the system may add a compensation latency model to estimate latency of the next process as a control input for the viewport prediction model selector. The viewport prediction model selector may select the most appropriate prediction model to perform the viewport prediction, guaranteeing prediction accuracy. The system therefore provides an enhancement by including the viewport prediction model selector to estimate compensation latency to improve the accuracy of viewport prediction.

In one or more embodiments, total latency $\tau$ for client can be divided into two main parts: the process latency $L_{pro}$, which is affected by the content of streaming data and capability of process devices and the roundtrip network latency $L_{rtt}$.

$$\tau = L_{pro} + L_{rtt} \tag{1}$$

In a viewport-dependent immersive streaming system, the latency $\tau$ may be from tile downloading to rendering, which the system may calculate for the compensation latency.

In one or more embodiments, a data input of viewport prediction module is a set of past viewport trajectories $[V_{t-t_s}, \ldots, V_t]$, which are obtained from a HMD client sensor. The module output may be the predicted viewport $V'_{t+t_p}$. The compensation latency module may continue collecting the network latencies and process latencies in the past timelines. A viewport prediction model pool may include several trajectory-based viewport prediction models with different prediction intervals. When a viewport prediction operation is launched, the viewport prediction model selector may require an estimated compensation latency as an input, and may select a viewport prediction model with the nearest prediction interval with the estimated compensation latency to perform the prediction.

In one or more embodiments, the compensation latency can be divided into two main parts: the roundtrip network latency $L_{rtt}$ and process latency $L_{pro}$. The compensation latency can be dynamically changed as the FOV moves or as a network condition changes. In the real-time streaming system, the system may collect these two latencies for each frame at time i as $L_{rtt,i}$ and $L_{pro,i}$ as the inputs. When a viewport prediction operation needs to be launched at time t, the estimated $L'_{rtt,t}$ and $L'_{pro,t}$ can be calculated using weighted arithmetic average algorithm as following equations.

$$L'_{rtt,t} = \Sigma_{i=t-\Delta t}^{t}(L_{rtt,i} \times \omega_i) \div \Sigma_{i=t-\Delta t}^{t}\omega_i \tag{2}$$

$$L'_{pro,t} = \Sigma_{i=t-\Delta t}^{t}(L_{pro,i} \times \omega_i) \div \Sigma_{i=t-\Delta t}^{t}\omega_i \tag{3}$$

In Equation (2) and Equation (3), $\omega_i$ indicates the corresponding weight of latency of each frame from time $t-\Delta t$ to time t. To increase the impact of recent latency data on estimated compensation latency, the latency data which are nearer to time t may be given a higher weight contribution. The formulas of Equation (2) and Equation (3) are simplified when the weights are normalized such that they sum up to 1, i.e., $$\sum_{i=t-t_N}^{t} \omega_i = 1.$$

In one or more embodiments, when the $L'_{rtt,t}$ and $L'_{pro,t}$ are calculated, the estimated compensation latency $L'_t$ is shown in Equation (4).

$$L'_t = L'_{rtt,t} + L'_{pro,t} \tag{4}$$

In one or more embodiments, when the estimated compensation latency $L'_t$ is obtained by the system, the estimated compensation latency can be used by the viewport prediction model selector to select a viewport prediction model $M_k$ from among a prediction model pool (size=N) whose interval $I_k$ is nearest to $L'_t$. i.e., $\text{abs}(I_k-L'_t)=\min\{\text{abs}(I_j-L'_t)\}$, j=1, . . . , N. The chosen viewport prediction model $M_k$ will perform the prediction in the current timeline (e.g., using Equation (5) below).

$$V'_{t+t_p} = M_k(V_{t-t_s}, \ldots, V_t) \tag{5}$$

In one or more embodiments, due to the dynamic fluctuation of compensation latency caused by network conditions, streaming contents, and/or device capabilities/operations, previous viewport predictions with a fixed prediction interval will experience an accuracy loss if the prediction interval is not equal to the real compensation latency in the system. The present disclosure will improve the accuracy of viewport prediction in a real-time viewport-dependent streaming system. The system may collect the real-time feedback of compensation latency and estimate the compensation latency in the next process. The system may implement a viewport prediction model selector to select the prediction model with the most appropriate interval (e.g., which is nearest to estimated compensation latency) from the model pool, which will effectively improve the accuracy of viewport prediction in the real-time system.

FIG. 1 is a network diagram illustrating an example system for latency-adaptive viewport prediction for viewport-dependent content streaming, according to some example embodiments of the present disclosure.

Referring to FIG. 1, a user 102 wearing a HMD device 104 (e.g., for VR/AR applications) may be presented with viewport-dependent streaming content via the HMD device 104. The HMD device 104 may include head motion tracking 106 (e.g., sensors and processing), which may provide the viewports captured by the HMD device 104 to a VR/AR agent 107 (e.g., either part of the HMD device 104 or remote from the HMD device 104, such as a cloud-based system). A viewport prediction model selector 108 (e.g., modules) of the VR/AR agent 107 may receive the viewports from the HMD device 104. The viewport prediction model selector 108 also may receive compensation latency estimates from a compensation latency estimation engine 110 (e.g., modules). Based on the viewports and the compensation latency estimations, the viewport prediction model selector 108 may select a viewport prediction model, from among multiple candidate prediction models, with which to predict future viewports for the HMD device 104. The VR/AR agent 107 may select tiles within the user's FOV, and may download the corresponding content from a content provider 114 (e.g., one or more content servers or other devices), using one or more content delivery networks 116. The VR/AR agent 107 may unpack 118 the tiles, set the unpacked tiles in a packet queue 120, and provide the queued packets to the HMD device 104 for decoding 122 (e.g., using a decoder) and rendering 124.

Figure 2:
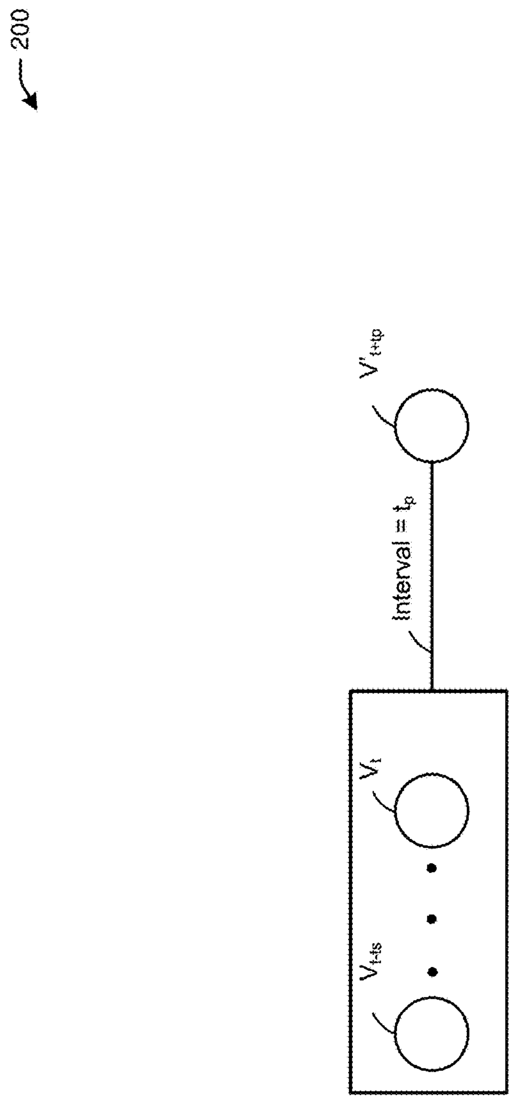
FIG. 2 illustrates a trajectory-based viewport prediction, according to some example embodiments of the present disclosure.

FIG. 2 illustrates a trajectory-based viewport prediction 200, according to some example embodiments of the present disclosure.

Referring to FIG. 2, a future viewport $V'_{t+t_p}$ may be predicted based on a past trajectory of previous viewports (e.g., of the HMD 104 of FIG. 1) $[V_{t-t_s}, \ldots, V]$ to compensate for the latency of the pipeline from user pose response to content rendering. When viewport prediction is adopted, the general steps are: (1) the client requires contents within predicted FOV, (2) processes the FOV streams (3) renders to screen. If the prediction interval is equal to compensation latency and the prediction is accurate, the M2P latency will be avoided.

Figure 3:
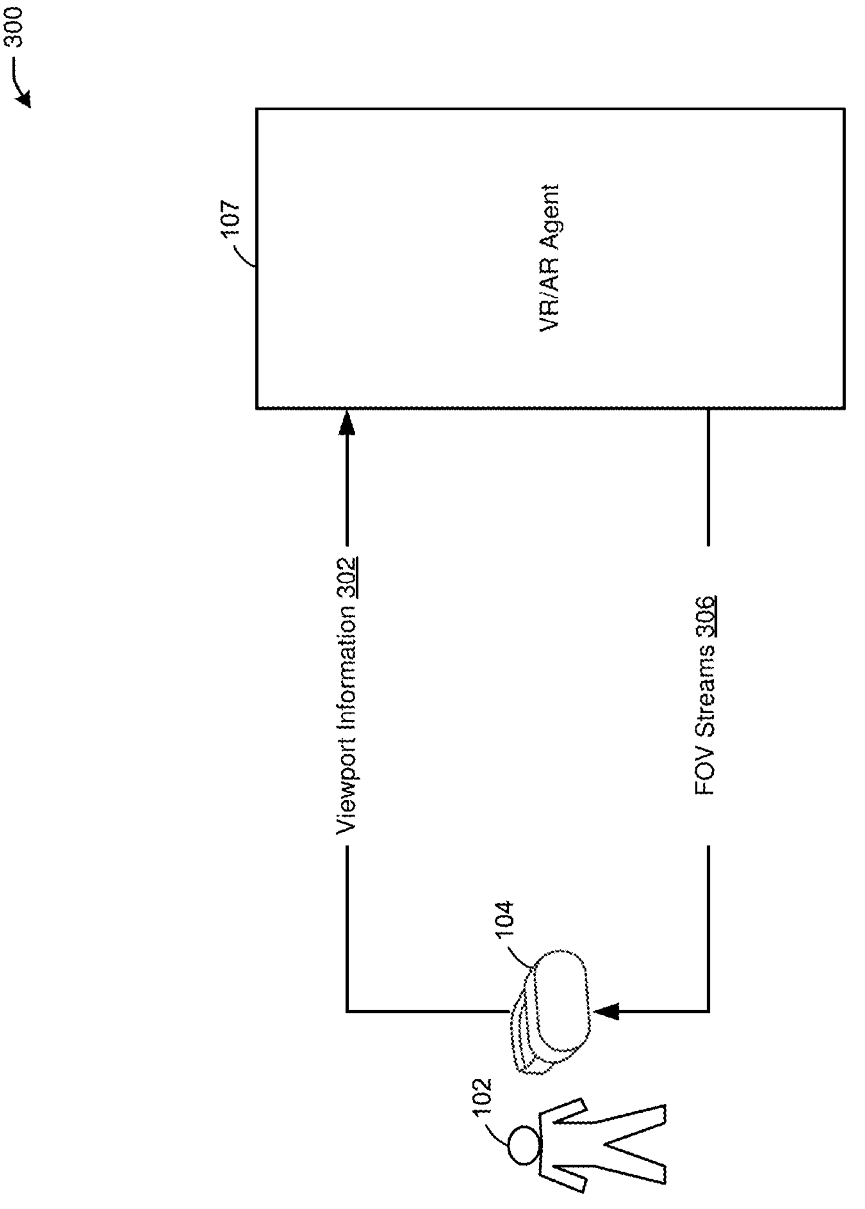
FIG. 3 illustrates an example system for generating field-of-view streams, according to some example embodiments of the present disclosure.

FIG. 3 illustrates an example system 300 for generating field-of-view streams, according to some example embodiments of the present disclosure.

Referring to FIG. 3, the user 102 may be wearing the HMD device 104 of FIG. 1. Viewport information 302 may be provided by the HMD device 104 to the VR/AR agent 107 for data stream processing. The VR/AR agent 107 may generate FOV streams 306 for the HMD device 104 to render.

In one or more embodiments, the compensation latency may be considered as the latency from the VR/AR agent 107 of FIG. 1 receiving the viewport information 302 (e.g., from the head motion tracking 106 of FIG. 1) to the generation of the FOV streams 306 for rendering at the HMD device 104. The compensation latency changes dynamically according to the network status, streaming contents complexity, and capability of devices in system. Thus, the compensation latency at one time may be different than the compensation latency at another time. Dynamically selecting a viewport prediction model (e.g., using the viewport prediction model selector 108 of FIG. 1) as the compensation latency changes over time may allow for more accurate viewport predictions, and therefore reduced M2P latency and improved user experience.

Figure 4:
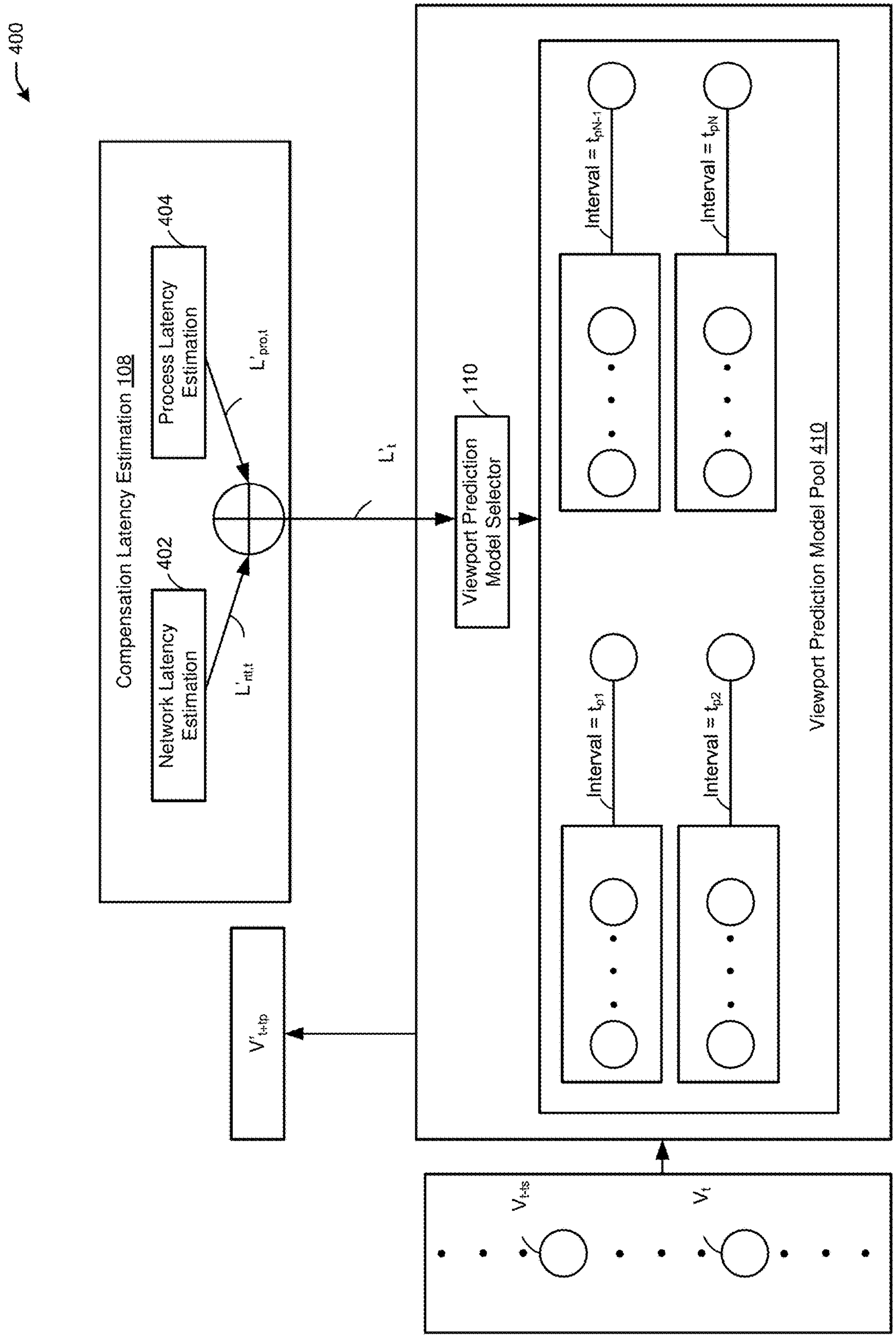
FIG. 4 is a diagram illustrating an example system for latency-adaptive viewport prediction for viewport-dependent content streaming, according to some example embodiments of the present disclosure.

FIG. 4 is a diagram illustrating an example system 400 for latency-adaptive viewport prediction for viewport-dependent content streaming, according to some example embodiments of the present disclosure.

Referring to FIG. 4, a more detailed view of the compensation latency estimation engine 108 and the viewport prediction model selector 110 of FIG. 1 is shown. The compensation latency estimation engine 108 may divide compensation latency into two parts: (1) the roundtrip network latency $L_{rtt}$, and (2) process latency $L_{pro}$, each of which may vary over time. The latency estimation engine 108 may include a network latency estimation engine 402 to estimate the roundtrip network latency $L_{rtt}$, and may include a process latency estimation engine 404 to estimate process latency $L_{pro}$. At time i, the compensation latency estimation engine 108 may generate an estimated $L'_{rtt,t}$ and an estimated $L'_{pro,t}$ using Equations (2) and (3), respectively. Based on the estimated $L'_{rtt,t}$ and the estimated $L'_{pro,t}$, the compensation latency estimation engine 108 may generate an estimated compensation latency $L'_t$ using Equation (4), and may provide the estimated compensation latency $L'_t$ to the viewport prediction model selector 110.

Still referring to FIG. 4, the viewport prediction model selector 110 may receive the estimated compensation latency $L'_t$ and use it to select a viewport prediction model $M_k$ from a viewport prediction model pool 410. The viewport prediction model pool 410 may include multiple viewport prediction models (e.g., N models) available for selection. The viewport prediction models each may use a different time interval $I_k$ for their viewport prediction (e.g., interval $t_{p1}$, interval $t_{p2}$, interval $t_{pN-1}$, interval $t_{pN}$). The viewport prediction model selector 110 may determine which prediction model's time interval $I_k$ is closest to the estimated compensation latency $L'_t$, such as by using the equation: $abs(I_k-L'_t)=\min\{abs(I_j-L'_t)\}$, j=1, . . . , N. The viewport prediction model selector 110 may select the prediction model whose time interval $I_k$ is closest to the estimated compensation latency $L'_t$, and the selected viewport prediction model $M_k$ may perform the viewport prediction using Equation (5) to generate $V'_{t+t_p}$. Referring back to FIG. 1, the VR/AR agent 107 may rely on the viewport prediction $V'_{t+t_p}$ to select tiles within the user's FOV, and may download the corresponding content from the content provider 114. The process may be repeated at different times, which may result in different estimated compensation latency $L'_t$, which may result in different viewport prediction model $M_k$ selection, which may result in different viewport prediction $V'_{t+t_p}$, which may result in different content rendered to a user with less M2P latency.

Figure 5:
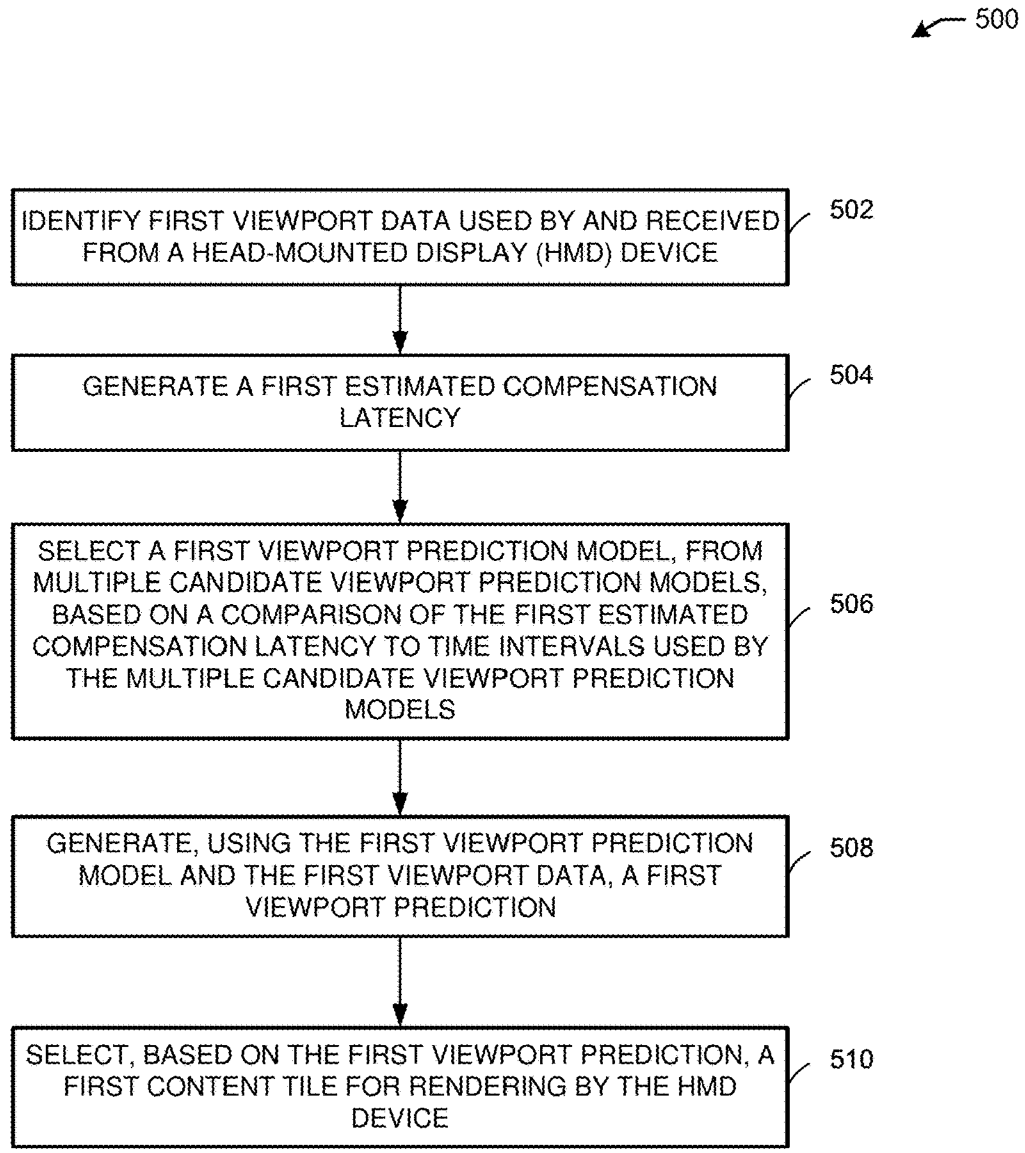
FIG. 5 is flow diagram of illustrative process for latency-adaptive viewport prediction for viewport-dependent content streaming, in accordance with one or more example embodiments of the present disclosure.

FIG. 5 is flow diagram of illustrative process 500 for latency-adaptive viewport prediction for viewport-dependent content streaming, in accordance with one or more example embodiments of the present disclosure.

Figure 6:
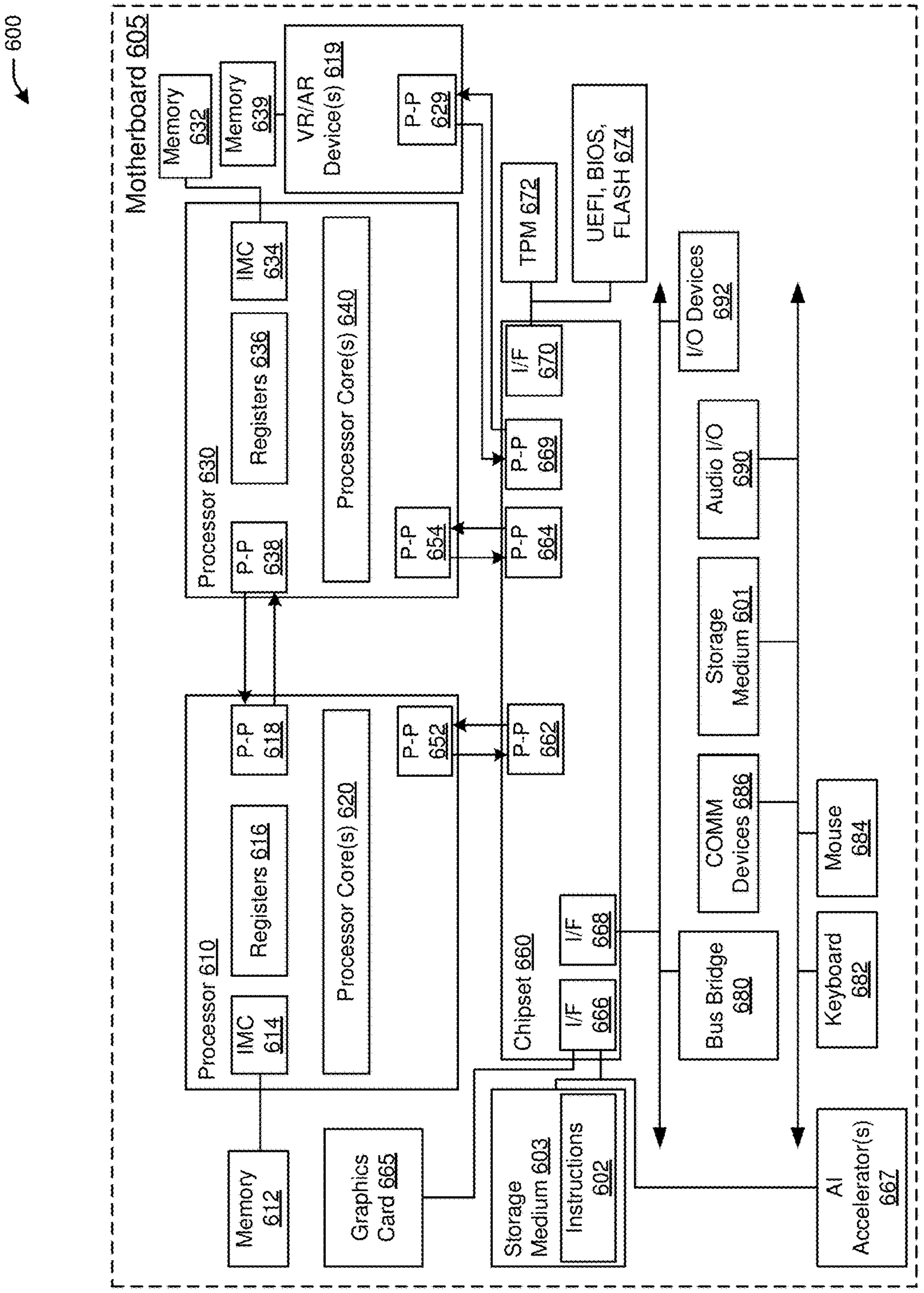
FIG. 6 illustrates an embodiment of an exemplary system, in accordance with one or more example embodiments of the present disclosure.

At block 502, a device (or system, e.g., the VR/AR agent 107 of FIG. 1 and FIG. 3, the system 400 of FIG. 4, the VR/AR devices 619 of FIG. 6) may identify first viewport data (e.g., the viewport information 302 of FIG. 3) used by and received from a HMD device (e.g., the HMD device 104 of FIG. 1 and FIG. 4).

At block 504, the device may generate an estimated compensation latency $L'_t$. The compensation latency estimation engine 108 of FIG. 1 and FIG. 4 may divide compensation latency into two parts: (1) the roundtrip network latency $L_{rtt}$, and (2) process latency $L_{pro}$, each of which may vary over time. The latency estimation engine 108 may include the network latency estimation engine 402 to estimate the roundtrip network latency $L_{rtt}$, and may include the process latency estimation engine 404 to estimate process latency $L_{pro}$. At time i, the compensation latency estimation engine 108 may generate an estimated $L'_{rtt,t}$ and an estimated $L'_{pro,t}$ using Equations (2) and (3), respectively. Based on the estimated $L'_{rtt,t}$ and the estimated $L'_{pro,t}$, the compensation latency estimation engine 108 may generate the estimated compensation latency $L'_t$ using Equation (4), and may provide the estimated compensation latency $L'_t$ to the viewport prediction model selector 110.

At block 506, the device may select, from among multiple candidate viewport prediction models (e.g., the viewport prediction model pool 410 of FIG. 4), the viewport prediction model whose time interval is closest to the estimated compensation latency. The viewport prediction model selector 110 of FIG. 1 and FIG. 4 may determine which prediction model's time interval $I_k$ is closest to the estimated compensation latency $L'_t$, such as by using the equation: $abs(I_k-L'_t)=min\{abs(I_j-L'_t)\}$, j=1, . . . , N. The viewport prediction model selector 110 may select the prediction model whose time interval $I_k$ is closest to the estimated compensation latency $L'_t$.

At block 508, the device may generate, using the selected viewport prediction model and the viewport data, a viewport prediction. The selected viewport prediction model $M_k$ may perform the viewport prediction using Equation (5) to generate $V'_{t+t_p}$.

At block 510, the device may select, based on the viewport prediction, a content tile for rendering using the HMD device. Referring back to FIG. 1, the VR/AR agent 107 may rely on the viewport prediction $V'_{t+t_p}$ to select tiles within the user's FOV, and may download the corresponding content from the content provider 114.

The process 500 may be repeated at different times, which may result in different estimated compensation latency $L'_t$, which may result in different viewport prediction model $M_k$ selection, which may result in different viewport prediction.

The examples herein are not meant to be limiting.

FIG. 5 illustrates an embodiment of an exemplary system 600, in accordance with one or more example embodiments of the present disclosure.

In various embodiments, the computing system 600 may comprise or be implemented as part of an electronic device.

In some embodiments, the computing system 600 may be representative, for example, of a computer system that implements one or more components of FIG. 1, FIG. 3, and FIG. 4.

The embodiments are not limited in this context. More generally, the computing system 600 is configured to implement all logic, systems, processes, logic flows, methods, equations, apparatuses, and functionality described herein and with reference to FIGS. 1-5.

The system 600 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores.

In at least one embodiment, the computing system 600 is representative of one or more components of FIG. 1, FIG. 3, and FIG. 4. More generally, the computing system 600 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard 605 for mounting platform components. The motherboard 605 is a point-to-point interconnect platform that includes a processor 610, a processor 630 coupled via a point-to-point interconnects as an Ultra Path Interconnect (UPI), and one or more VR/AR devices 619 (e.g., capable of performing the functions of FIGS. 1-5). In other embodiments, the system 600 may be of another bus architecture, such as a multi-drop bus. Furthermore, each of processors 610 and 630 may be processor packages with multiple processor cores. As an example, processors 610 and 630 are shown to include processor core(s) 620 and 640, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 610 and the chipset 660. platforms may include additional components and some platforms may only include sockets to mount the processors and/or the chipset.

The processors 610 and 630 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 610, and 630.

The processor 510 includes an integrated memory controller (IMC) 614 and point-to-point (P-P) interfaces 618 and 652. Similarly, the processor 630 includes an IMC 634 and P-P interfaces 638 and 654. The IMC's 614 and 634 couple the processors 610 and 630, respectively, to respective memories, a memory 612 and a memory 632. The memories 612 and 632 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 612 and 632 locally attach to the respective processors 610 and 630.

In addition to the processors 610 and 630, the system 600 may include the one or more VR/AR devices 619. The one or more VR/AR devices 619 may be connected to chipset 660 by means of P-P interfaces 629 and 669. The one or more VR/AR devices 619 may also be connected to a memory 639. In some embodiments, the one or more VR/AR devices 619 may be connected to at least one of the processors 610 and 630. In other embodiments, the memories 612, 632, and 639 may couple with the processor 610 and 630, and the one or more VR/AR devices 619 via a bus and shared memory hub.

System 600 includes chipset 660 coupled to processors 610 and 630. Furthermore, chipset 660 can be coupled to storage medium 603, for example, via an interface (I/F) 566. The I/F 666 may be, for example, a Peripheral Component Interconnect-enhanced (PCI-e). The processors 610, 630, and the one or more VR/AR devices 619 may access the storage medium 603 through chipset 660.

Storage medium 603 may comprise any non-transitory computer-readable storage medium or machine-readable storage medium, such as an optical, magnetic or semiconductor storage medium. In various embodiments, storage medium 603 may comprise an article of manufacture. In some embodiments, storage medium 603 may store computer-executable instructions, such as computer-executable instructions 602 to implement one or more of processes or operations described herein, (e.g., process 500 of FIG. 5). The storage medium 603 may store computer-executable instructions for any equations depicted above. The storage medium 603 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 610 couples to a chipset 660 via P-P interfaces 652 and 662 and the processor 630 couples to a chipset 660 via P-P interfaces 654 and 664. Direct Media Interfaces (DMIs) may couple the P-P interfaces 652 and 662 and the P-P interfaces 654 and 664, respectively. The DMI may be a high-speed interconnect that facilitates, e.g., eight Giga Transfers per second (GT/s) such as DMI 3.0. In other embodiments, the processors 610 and 630 may interconnect via a bus.

The chipset 660 may comprise a controller hub such as a platform controller hub (PCH). The chipset 660 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 660 may comprise more than one controller hub such as a chipset with a memory controller hub, a graphics controller hub, and an input/output (I/O) controller hub.

In the present embodiment, the chipset 660 couples with a trusted platform module (TPM) 672 and the UEFI, BIOS, Flash component 674 via an interface (I/F) 670. The TPM 672 is a dedicated microcontroller designed to secure hardware by integrating cryptographic keys into devices. The UEFI, BIOS, Flash component 674 may provide pre-boot code.

Furthermore, chipset 660 includes the I/F 666 to couple chipset 660 with a high-performance graphics engine, graphics card 665. In other embodiments, the system 600 may include a flexible display interface (FDI) between the processors 610 and 630 and the chipset 660. The FDI interconnects a graphics processor core in a processor with the chipset 660.

Various I/O devices 692 couple to the bus 681, along with a bus bridge 680 which couples the bus 681 to a second bus 691 and an I/F 668 that connects the bus 681 with the chipset 660. In one embodiment, the second bus 691 may be a low pin count (LPC) bus. Various devices may couple to the second bus 691 including, for example, a keyboard 682, a mouse 684, communication devices 686, a storage medium 601, and an audio I/O 690.

The artificial intelligence (AI) accelerator 667 may be circuitry arranged to perform computations related to AI. The AI accelerator 667 may be connected to storage medium 503 and chipset 660. The AI accelerator 667 may deliver the processing power and energy efficiency needed to enable abundant-data computing. The AI accelerator 667 is a class of specialized hardware accelerators or computer systems designed to accelerate artificial intelligence and machine learning applications, including artificial neural networks and machine vision. The AI accelerator 667 may be applicable to algorithms for robotics, internet of things, other data-intensive and/or sensor-driven tasks.

Many of the I/O devices 692, communication devices 686, and the storage medium 601 may reside on the motherboard 605 while the keyboard 682 and the mouse 684 may be add-on peripherals. In other embodiments, some or all the I/O devices 692, communication devices 686, and the storage medium 601 are add-on peripherals and do not reside on the motherboard 605.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example 1 may be a method for latency-adaptive viewport prediction for viewport-dependent content streaming, the method comprising: identifying, by processing circuitry of a virtual reality (VR) or augmented reality (AR) device, first viewport data used by and received from a display device; generating, by the processing circuitry, a first estimated compensation latency based on at least one of a first network latency and a first process latency associated with the AR or VR device; selecting, by the processing circuitry, from among multiple candidate viewport prediction models each using a different respective time interval, a first viewport prediction model based on a comparison of the first estimated compensation latency to a first time interval used by the first viewport prediction model; generating, by the processing circuitry, using the first viewport prediction model and the first viewport data, a first viewport prediction; and selecting, by the processing circuitry, based on the first viewport prediction, a first content tile for rendering by the display device.

Example 2 may include the method of example 1 and/or some other example herein, further comprising: identifying second viewport data used by and received from the display device; generating a second estimated compensation latency based on at least one of a second network latency and a second process latency associated with the AR or VR device, the second estimated compensation latency different than the first estimated compensation latency; selecting a second viewport prediction model of the multiple candidate viewport prediction models based on a comparison of the second estimated compensation latency to a second time interval used by the second viewport prediction model; generating, using the second viewport prediction model, a second viewport prediction; and selecting, based on the second viewport prediction, a second content file for rendering by the display device.

Example 3 may include the method of example 2 and/or some other example herein, wherein the first network latency and the first process latency are associated with a first time, and wherein the second network latency and the second process latency are associated with a second time.

Example 4 may include the method of example 1 and/or some other example herein, further comprising: identifying a request to generate the first viewport prediction at a first time, wherein the first network latency and the first process latency are associated with a second time, and wherein the first network latency and the first process latency are based on a weighted average using a latency weight value based on a difference between the first time and the second time.

Example 5 may include the method of example 4 and/or some other example herein, wherein the latency weight value is inversely proportional to the difference.

Example 6 may include the method of example 1 or example 4 and/or some other example herein, wherein generating the first estimated compensation latency is based on a sum of the first network latency and the first process latency.

Example 7 may include the method of example 1 and/or some other example herein, wherein selecting the first viewport prediction model based on the comparison of the first estimated compensation latency to the first time interval used by the first viewport prediction model comprises: identifying the first viewport prediction model; determining that the first viewport prediction model uses the first time interval; identifying a second viewport prediction model of the multiple candidate viewport prediction models; determining that the second viewport prediction model uses a second time interval; determining a first difference between the first time interval and the first estimated compensation latency; determining a second difference between the second time interval and the first estimated compensation latency; and determining that the first difference is less than the second difference, wherein selecting the first viewport prediction model is based on the first difference being less than the second difference.

Example 8 may include the method of example 1 and/or some other example herein, wherein the first viewport data comprise past viewport trajectories used by the display device, and wherein generating the first viewport prediction comprises the first viewport prediction model generating the first viewport prediction based on a timeline indicated by the past viewport trajectories.

Example 9 may include a computer-readable storage medium comprising instructions to perform the methods of any of examples 1-8.

Example 10 may include an apparatus comprising means for performing any of the methods of any of examples 1-8.

Example 11 may include a computer-readable medium comprising instructions to cause processing circuitry of a user virtual reality (VR) or augmented reality (AR) device, upon execution of the instructions by the processing circuitry, to: identify first viewport data used by and received from a display device; generate a first estimated compensation latency based on at least one of a first network latency and a first process latency associated with the AR or VR device; select, from among multiple candidate viewport prediction models each using a different respective time interval, a first viewport prediction model based on a comparison of the first estimated compensation latency to a first time interval used by the first viewport prediction model; generate, using the first viewport prediction model and the first viewport data, a first viewport prediction; and select, based on the first viewport prediction, a first content tile for rendering by the display device.

Example 12 may include the computer-readable medium of example 11 and/or some other example herein, identify second viewport data used by and received from the display device; generate a second estimated compensation latency based on at least one of a second network latency and a second process latency associated with the AR or VR device, the second estimated compensation latency different than the first estimated compensation latency; select a second viewport prediction model of the multiple candidate viewport prediction models based on a comparison of the second estimated compensation latency to a second time interval used by the second viewport prediction model; generate, using the second viewport prediction model, a second viewport prediction; and select, based on the second viewport prediction, a second content file for rendering by the display device.

Example 13 may include the computer-readable medium of example 12 and/or some other example herein, wherein the first network latency and the first process latency are associated with a first time, and wherein the second network latency and the second process latency are associated with a second time.

Example 14 may include the computer-readable medium of example 11 and/or some other example herein, wherein execution of the instructions further causes the processing circuitry to: identify a request to generate the first viewport prediction at a first time, wherein the first network latency and the first process latency are associated with a second time, and wherein the first network latency and the first process latency are based on a weighted average using a latency weight value based on a difference between the first time and the second time.

Example 15 may include the computer-readable medium of example 14 and/or some other example herein, wherein the latency weight value is inversely proportional to the difference.

Example 16 may include the computer-readable medium of example 11 or example 14 and/or some other example herein, wherein to generate the first estimated compensation latency is based on a sum of the first network latency and the first process latency.

Example 17 may include the computer-readable medium of example 11 and/or some other example herein, wherein to select the first viewport prediction model based on the comparison of the first estimated compensation latency to the first time interval used by the first viewport prediction model comprises to: identify the first viewport prediction model; determine that the first viewport prediction model uses the first time interval; identify a second viewport prediction model of the multiple candidate viewport prediction models; determine that the second viewport prediction model uses a second time interval; determine a first difference between the first time interval and the first estimated compensation latency; determine a second difference between the second time interval and the first estimated compensation latency; and determine that the first difference is less than the second difference, wherein to select the first viewport prediction model is based on the first difference being less than the second difference.

Example 18 may include the computer-readable medium of example 11 and/or some other example herein, wherein the first viewport data comprise past viewport trajectories used by the display device, and wherein to generate the first viewport prediction comprises the first viewport prediction model generating the first viewport prediction based on a timeline indicated by the past viewport trajectories.

Example 19 may include a system for latency-adaptive viewport prediction for viewport-dependent content streaming, the system comprising at least one processor coupled to memory, the at least one processor configured to: identify first viewport data used by and received from a display device; generate a first estimated compensation latency based on at least one of a first network latency and a first process latency associated with an AR or VR device; select, from among multiple candidate viewport prediction models each using a different respective time interval, a first viewport prediction model based on a comparison of the first estimated compensation latency to a first time interval used by the first viewport prediction model; generate, using the first viewport prediction model and the first viewport data, a first viewport prediction; and select, based on the first viewport prediction, a first content tile for rendering by the display device.

Example 20 may include the system of example 19 and/or some other example herein, wherein the at least one processor is further configured to: identify second viewport data used by and received from the display device; generate a second estimated compensation latency based on at least one of a second network latency and a second process latency associated with the AR or VR device, the second estimated compensation latency different than the first estimated compensation latency; select a second viewport prediction model of the multiple candidate viewport prediction models based on a comparison of the second estimated compensation latency to a second time interval used by the second viewport prediction model; generate, using the second viewport prediction model, a second viewport prediction; and select, based on the second viewport prediction, a second content file for rendering by the display device.

Example 21 may include the system of example 20 and/or some other example herein, wherein the first network latency and the first process latency are associated with a first time, and wherein the second network latency and the second process latency are associated with a second time.

Example 22 may include the system of example 19 and/or some other example herein, wherein the at least one processor is further configured to: identify a request to generate the first viewport prediction at a first time, wherein the first network latency and the first process latency are associated with a second time, and wherein the first network latency and the first process latency are based on a weighted average using a latency weight value based on a difference between the first time and the second time.

Example 23 may include the system of example 22 and/or some other example herein, wherein the latency weight value is inversely proportional to the difference.

Example 24 may include the system of example 19 or example 22 and/or some other example herein, wherein to generate the first estimated compensation latency is based on a sum of the first network latency and the first process latency.

Example 25 may include the system of example 19 and/or some other example herein, wherein to select the first viewport prediction model based on the comparison of the first estimated compensation latency to the first time interval used by the first viewport prediction model comprises to: identify the first viewport prediction model; determine that the first viewport prediction model uses the first time interval; identify a second viewport prediction model of the multiple candidate viewport prediction models; determine that the second viewport prediction model uses a second time interval; determine a first difference between the first time interval and the first estimated compensation latency; determine a second difference between the second time interval and the first estimated compensation latency; and determine that the first difference is less than the second difference, wherein to select the first viewport prediction model is based on the first difference being less than the second difference.

Example 26 may include an apparatus comprising means for: identifying, by a virtual reality (VR) or augmented reality (AR) device, first viewport data used by and received from a display device; generating a first estimated compensation latency based on at least one of a first network latency and a first process latency associated with the AR or VR device; selecting, from among multiple candidate viewport prediction models each using a different respective time interval, a first viewport prediction model based on a comparison of the first estimated compensation latency to a first time interval used by the first viewport prediction model; generating, using the first viewport prediction model and the first viewport data, a first viewport prediction; and selecting, based on the first viewport prediction, a first content tile for rendering by the display device.

Example 27 may include one or more computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:

a display device;

computer readable instructions; and at least one of an augmented reality (AR) device or a virtual reality (VR) device including at least one processor circuit to be programmed based on the computer readable instructions to:

generate a first compensation latency based on at least one of a first network latency or a first process latency associated with the at least one of the AR device or the VR device;

select, from among multiple candidate viewport prediction models associated with respective different time intervals, a first viewport prediction model based on a comparison of the first compensation latency to a first time interval associated with the first viewport prediction model;

generate a first viewport prediction based on the first viewport prediction model and first viewport data from the display device; and select, based on the first viewport prediction, a first content tile to be rendered by the display device.

2. The system of claim 1, wherein one or more of the at least one processor circuit is configured to:

obtain second viewport data used from the display device;

generate a second compensation latency based on at least one of a second network latency or a second process latency associated with the at least one of the AR device or the VR device, the second compensation latency different than the first compensation latency;

select a second viewport prediction model of the multiple candidate viewport prediction models based on a comparison of the second compensation latency to a second time interval associated with the second viewport prediction model;

generate, based on the second viewport prediction model, a second viewport prediction; and select, based on the second viewport prediction, a second content file to be rendered by the display device.

3. The system of claim 2, wherein the first network latency and the first process latency are associated with a first time, and the second network latency and the second process latency are associated with a second time.

4. The system of claim 1, wherein one or more of the at least one processor circuit is to identify a request to generate the first viewport prediction at a first time, wherein the first network latency and the first process latency are associated with a second time, and the first network latency and the first process latency are based on a weighted average, the weighted average based on a latency weight value, the latency weight value based on a difference between the first time and the second time.

5. The system of claim 4, wherein the latency weight value is inversely proportional to the difference.

6. The system of claim 1, wherein one or more of the at least one processor circuit is to generate the first compensation latency based on a sum of the first network latency and the first process latency.

7. The system of claim 1, wherein to select the first viewport prediction model, one or more of the at least one processor circuit is to:

identify the first viewport prediction model;

determine that the first viewport prediction model is associated with the first time interval;

identify a second viewport prediction model of the multiple candidate viewport prediction models;

determine that the second viewport prediction model is associated with a second time interval;

determine a first difference between the first time interval and the first compensation latency;

determine a second difference between the second time interval and the first compensation latency; and select the first viewport prediction model based on the first difference being less than the second difference.

8. A non-transitory computer-readable storage medium comprising instructions to cause at least one processor circuit of at least one of a user virtual reality (VR) device or an augmented reality (AR) device to at least:

generate a first compensation latency based on at least one of a first network latency or a first process latency associated with the at least one of the VR device or the AR device;

select, from among multiple candidate viewport prediction models associated with respective different respective time intervals, a first viewport prediction model based on a comparison of the first compensation latency to a first time interval associated the first viewport prediction model;

generate a first viewport prediction based the first viewport prediction model and first viewport data; and select, based on the first viewport prediction, a first content tile to be rendered by a display.

9. The non-transitory computer-readable storage medium of claim 8, wherein the instructions cause one or more of the at least one processor circuit to:

obtain second viewport data;

generate a second compensation latency based on at least one of a second network latency or a second process latency associated with the at least one of the VR device or the AR device, the second compensation latency different than the first compensation latency;

select a second viewport prediction model of the multiple candidate viewport prediction models based on a comparison of the second compensation latency to a second time interval associated with the second viewport prediction model;

generate, based on the second viewport prediction model, a second viewport prediction; and select, based on the second viewport prediction, a second content file to be rendered by the display.

10. The non-transitory computer-readable storage medium of claim 9, wherein the first network latency and the first process latency are associated with a first time, and the second network latency and the second process latency are associated with a second time.

11. The non-transitory computer-readable storage medium of claim 8, wherein the instructions are to cause one or more of the at least one processing circuit to identify a request to generate the first viewport prediction at a first time, wherein the first network latency and the first process latency are associated with a second time, the first network latency and the first process latency are based on a weighted average, the weighted average based on a latency weight value, the latency weight value based on a difference between the first time and the second time.

12. The non-transitory computer-readable storage medium of claim 11, wherein the latency weight value is inversely proportional to the difference.

13. The non-transitory computer-readable storage medium of claim 8, wherein the instructions are cause one or more of the at least one processing circuit to generate the first compensation latency based on a sum of the first network latency and the first process latency.

14. The non-transitory computer-readable storage medium of claim 8, wherein to select the first viewport prediction model, the instructions are to cause one or more of the at least one processor circuit to:

identify the first viewport prediction model;

determine that the first viewport prediction model is associated with the first time interval;

identify a second viewport prediction model of the multiple candidate viewport prediction models;

determine that the second viewport prediction model is associated with a second time interval;

determine a first difference between the first time interval and the first compensation latency;

determine a second difference between the second time interval and the first compensation latency; and select the first viewport prediction model based on the first difference being less than the second difference.

15. The non-transitory computer-readable storage medium of claim 8, wherein the first viewport data includes past viewport trajectories u and to generate the first viewport prediction, the instructions are to cause one of more of the at least one processor circuit use the first viewport prediction model to generate the first viewport prediction based on a timeline based on the past viewport trajectories.

16. A method comprising:

generating, by at least one processor circuit programmed based on at least one instruction, a first compensation latency based on at least one of a first network latency or a first process latency associated with at least one of an augmented reality (AR) device or a virtual reality (VR) device;

selecting, from among multiple candidate viewport prediction models associated with respective different time intervals, a first viewport prediction model based on a comparison of the first compensation latency to a first time interval associated with the first viewport prediction model;

generating, by one or more of the at least one processor circuit, a first viewport prediction based on the first viewport prediction model and first viewport data; and selecting, based on the first viewport prediction, a first content tile to be rendered by a display.

17. The method of claim 16, including identifying a request to generate the first viewport prediction at a first time, wherein the first network latency and the first process latency are associated with a second time, and the first network latency and the first process latency are based on a weighted average, the weighted average based on a latency weight value, the latency weight value based on a difference between the first time and the second time.

18. The method of claim 17, wherein the latency weight value is inversely proportional to the difference.

19. The method of claim 16, wherein the generating of the first compensation latency is based on a sum of the first network latency and the first process latency.

20. The method of claim 16, wherein the selecting of the first viewport prediction model includes:

identifying the first viewport prediction model;

determining that the first viewport prediction model is associated with the first time interval;

identifying a second viewport prediction model of the multiple candidate viewport prediction models;

determining that the second viewport prediction model is associated with a second time interval;

determining a first difference between the first time interval and the first compensation latency;

determining a second difference between the second time interval and the first compensation latency; and selecting the first viewport prediction model based on the first difference being less than the second difference.

* * * * *